April 2, 1963 R. A. DOW 3,083,851
REFUSE DISPOSAL AND GENERAL TRUCK BED
Filed July 28, 1961 8 Sheets-Sheet 1

INVENTOR.
RAY A. DOW
BY
John H. Wilkinson
ATTORNEY

April 2, 1963  R. A. DOW  3,083,851
REFUSE DISPOSAL AND GENERAL TRUCK BED
Filed July 28, 1961  8 Sheets-Sheet 3

INVENTOR.
RAY A. DOW
BY
*John H. Widdowson*
ATTORNEY

April 2, 1963  R. A. DOW  3,083,851
REFUSE DISPOSAL AND GENERAL TRUCK BED
Filed July 28, 1961  8 Sheets-Sheet 5

INVENTOR.
RAY A. DOW
BY
John H. Widdowson
ATTORNEY

April 2, 1963 R. A. DOW 3,083,851
REFUSE DISPOSAL AND GENERAL TRUCK BED
Filed July 28, 1961 8 Sheets-Sheet 6
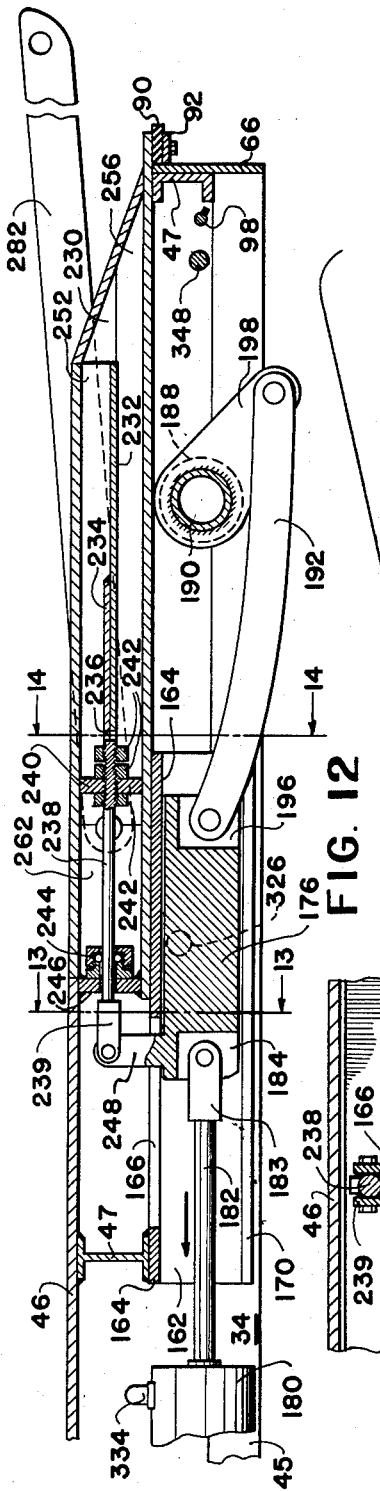
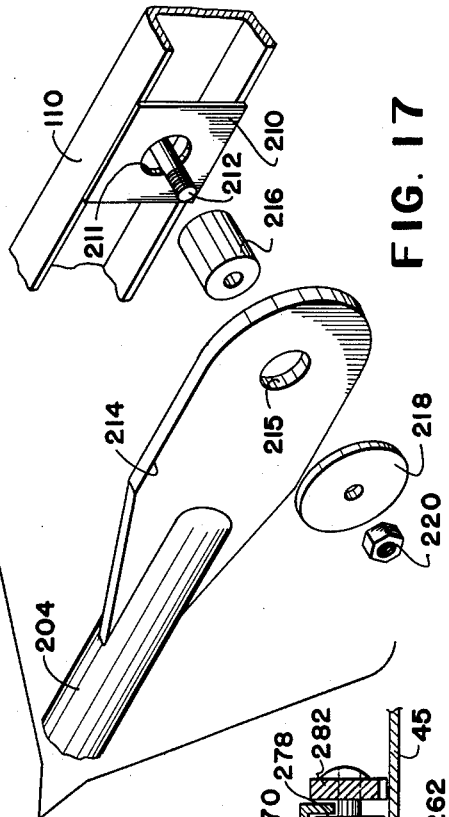
INVENTOR.
RAY A. DOW
BY
*John H. Widdowson*
ATTORNEY April 2, 1963   R. A. DOW   3,083,851
REFUSE DISPOSAL AND GENERAL TRUCK BED
Filed July 28, 1961   8 Sheets-Sheet 7

INVENTOR.
RAY A. DOW
BY
*John H. Widdowson*
ATTORNEY

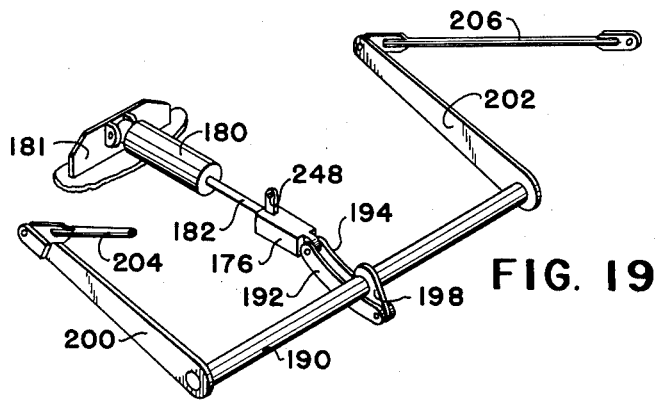
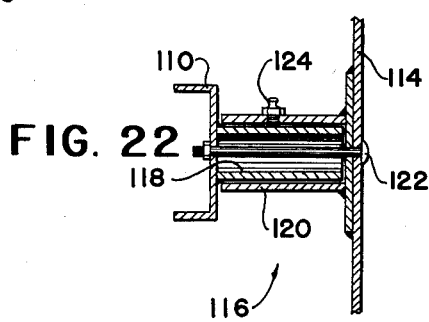
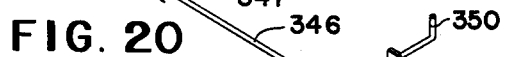
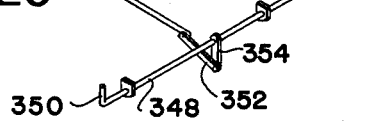
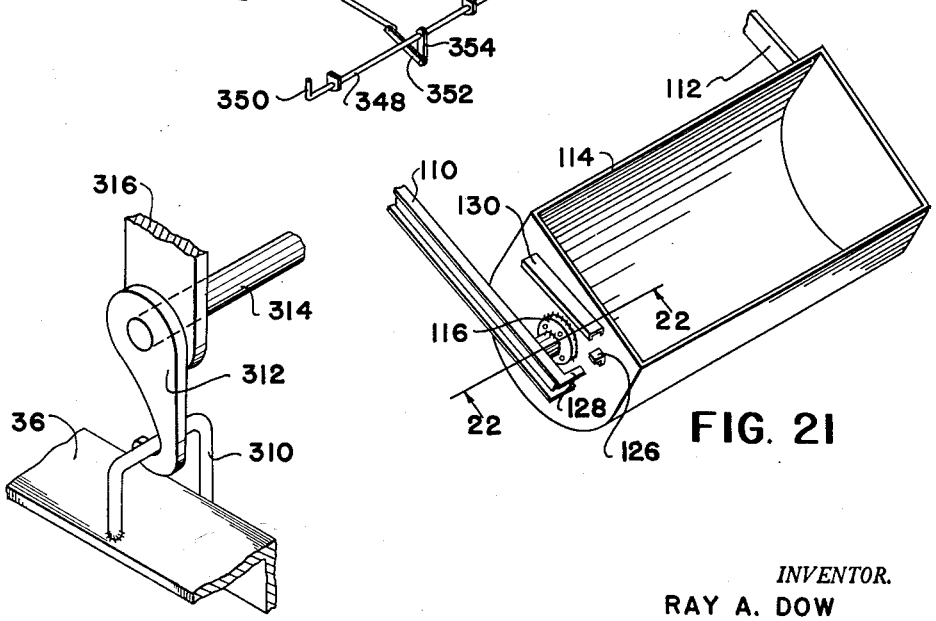

United States Patent Office

3,083,851
Patented Apr. 2, 1963

3,083,851
REFUSE DISPOSAL AND GENERAL TRUCK BED
Ray A. Dow, 501 N. 1st St., Fairview, Okla.
Filed July 28, 1961, Ser. No. 127,594
2 Claims. (Cl. 214—503)

This invention relates to vehicle means and, in a specific embodiment, to a vehicle particularly constructed to receive refuse and the like and to dump same.

This application is a continuation-in-part of application Serial No. 4,380 filed January 25, 1960, now Patent No. 3,069,037, entitled Refuse Disposal and General Truck Bed.

Various types of vehicles including refuse disposal trucks and the like are known to the art. In some of the prior art devices the operating structure passes through the truck bed and liquids deposited in the truck will be drained from the bed through openings therein and such seriously limits use of these devices since many health departments, sanitation officials and the like prohibit use of such trucks within areas of their authority due to the drainage of these unsanitary liquids from the truck onto the public streets and the like. Also, many of the prior art devices are complicated structurally, causing substantial increase in the initial cost of these items and additionally making maintenance relatively high. Furthermore, a plurality of hydraulic cylinders, servo-motors and/or other types of driving means are often required to perform separate functions, thereby giving rise to relatively inefficient operation and often inadequate utilization of the expensive drive means. Furthermore, many of the prior art devices do not provide adequate or satisfactory packing means to completely fill the truck bed before requiring dumping of the same, thus requiring relatively frequent trips to the dump area. This is expensive to the operator and costly in time and money. Applicant's present invention overcomes the foregoing and other disadvantages of the prior art devices.

In accordance with the present invention, a vehicle is provided having loading and unloading apparatus mounted on frame means which in turn are mounted for road movement. A bed is provided and is mounted on the frame means, preferably tiltably mounted on the rear end portion thereof, and the bed is open over at least a portion of the rear end thereof. Packer means are provided with the bed and positioned at the rear end thereof and normally close a portion of same with the packer means being operable to move refuse and the like deposited within the bed away from the rear end thereof to substantially fill the bed and to pack the refuse within the bed. Refuse loading means are provided to receive refuse and the like and to lift and deposit same into the bed. Power means are provided to operate the packer means and refuse loading means. The device is constructed and assembled to retain liquids deposited therein.

In a preferred specific embodiment of the invention, a bed is tiltably mounted on a truck frame or body and the bed is provided with an extension at the rear end portion thereof in which the packer means is mounted. The packer means preferably includes a plurality of plates or the like which are constructed and positioned to move inwardly into the truck bed and rearwardly therefrom in operation. Preferably the packer means extends across and closes a major portion of the rear end of the bed so that substantially all of the refuse deposited within the bed will be moved upon operation of the packer. Boom means or the like are pivotally mounted in one end portion on the extension of the bed and mount in the other end portion the bucket means with the bucket being positionable adjacent the ground and elevated in operation to a position above and forward of the packer means so that the refuse and the like deposited within the bed will be engaged and moved by the packer means. Power means, such as a servo-motor or the like, is mounted on the frame means and operably connected to a slide, mounted in a guide at the bottom of a bed so that operation of the power means reciprocates the slide. An axle is rotatably mounted to the bottom of the bed and is operably connected to the slide so that reciprocation of the slide causes rotation of the axle. The ends of the axle are connected through linking means to the booms so that movement of the axle causes the booms to be raised and lowered to lift and lower the bucket. The extension of the bed, the booms, and the packer means can be connected together and released from the bed so that rotation of the axle transmits a force to the link means to elevate this structure about the upper portion of the bed to open the rear end of the bed for dumping. The forward portion of the bed can then be released from the truck frame and the slide member locked from further rearward movement so that operation of the power means causes the entire bed to tilt about its mounting on the frame means, causing refuse and the like deposited and packed within the bed to be removed therefrom. Structure for operating the packer means preferably passes through the floor or bottom of the bed and is constructed to be sealed so that upon operation of the device no liquids will be lost therethrough. Also, the extension of the bed preferably has a bottom which is elevated at the rear end portion to prevent liquids from being lost therefrom and the connection between the extension of the bed and the rear portion of the bed is sealed so that liquids cannot be lost therefrom. The entire bed is thus entirely sealed and the objectionable features pointed out hereinbefore in regard to the prior art devices are eliminated.

Accordingly, it is an object of the invention to provide a new refuse disposal and general truck bed.

Another object of the invention is to provide new vehicle means having loading and unloading apparatus wherein liquids and the like received within the vehicle will not be lost.

A further object of the invention is to provide a new vehicle means having loading and unloading apparatus whereby the operating structure can pass through the bed without causing liquids to be lost therefrom.

A further object of the invention is to provide new packer means for a vehicle constructed to receive refuse and the like therein.

A further object of the invention is to provide new and relatively simple means to load and pack a vehicle.

A further object of the invention is to provide a vehicle having relatively simple and efficient loading and unloading apparatus.

Various other objects, advantages and features of the invention will become apparent to those skilled in the art from the following description, taken in connection with the accompanying drawings, in which:

FIG. 3 is a partial side elevation view of the vehicle of FIG. 1 showing the bucket down and in position to receive refuse and the like.

FIG. 12 is an enlarged partial cross section view taken along the line 12—12 of FIG. 10.

FIG. 13 is a partial cross section view taken along the line 13—13 of FIG. 12.

FIG. 14 is a partial cross section view taken along the lines 14—14 of FIGS. 10 and 12.

FIG. 17 is an enlarged exploded isometric view of a preferred means of mounting a connecting arm or link means and a boom.

FIG. 18 is an enlarged isometric view showing a preferred means of securing the forward portion of the bed to the truck chassis.

FIG. 19 is a diagrammatic isometric view illustrating the operating mechanism for the booms.

FIG. 20 is a diagrammatic isometric view of the hydraulic system and actuating mechanism in the preferred embodiment of the invention.

FIG. 21 is an enlarged isometric view of the bucket in the preferred embodiment of the invention.

FIG. 22 is an enlarged partial cross section view taken along the line 22—22 of FIG. 21.

Figure 1:
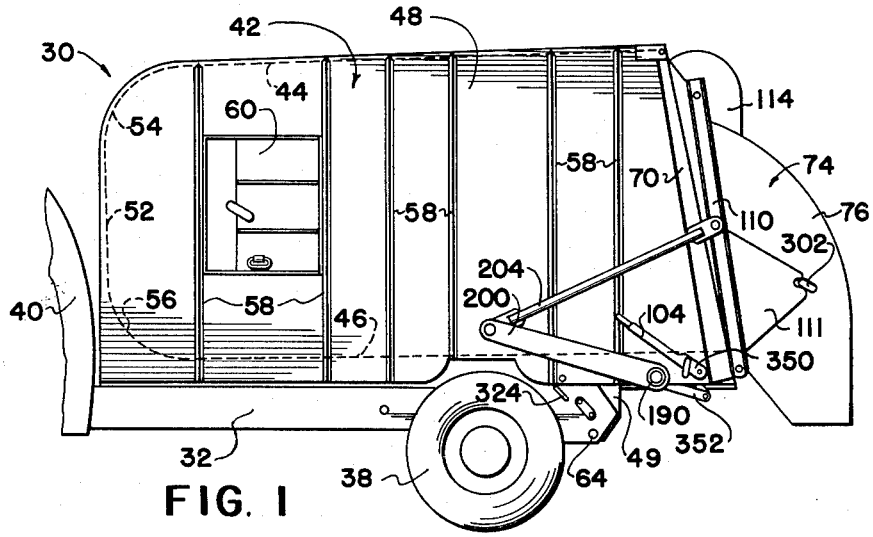
FIG. 1 is a side elevation view of a preferred specific embodiment of the vehicle of the invention in position for road movement.

The following is a discussion and description of a preferred specific embodiment of the new refuse disposal and general truck bed of the invention, such being made with reference to the drawings whereon the same reference numerals are used to indicate the same or similar parts and/or structure. It is to be understood that such discussion and description is not to unduly limit the scope of the invention.

Referring now to the drawings in detail, a vehicle is shown generally at 30 and includes frame means shown as the elongated frame members 32 and 34 and a plurality of cross frame members 36 extending therebetween, the frame means being mounted on suitable wheel means 38 in the usual and common manner. The frame means and wheel means can be parts of a common truck chassis, the truck cab being shown partially at 40.

A bed or body is shown generally at 42 and includes a top 44, a bottom 46, two sides 48 and 50 and a front end 52 which is preferably joined to the top 44 and bottom 46 by arcuate portions 54 and 56. The bed 42 can be reinforced as desired by suitable angle irons or other reinforcing members 58 on the sides and by supports or frame means 45 and 47 on the bottom of the bed. Doors 60 and 62 are provided in the forward portion of the bed 42 for access thereinto for repairs, inspection, etc. The entire bed 42 is tiltably mounted in its rear end portion of the frame means on an axle, pivot or the like 64 which receives arms 49 and 51. The axle 64 is preferably relatively low in relation to the frame means and the main portion of the bed so that the bed will be relatively easily tilted by the power means in the manner pointed out in detail hereinafter. The rear end of the main portion of the bed 42 is open and a plate or flange 66 extends downwardly from the lower edge of the bottom 46 and extends across the back of the bed 42 to the sides 48 and 50. The flange or plate 66 can be secured to the rear one of the supports or braces 47 secured on the bottom 46 of the bed 42.

Figure 2:
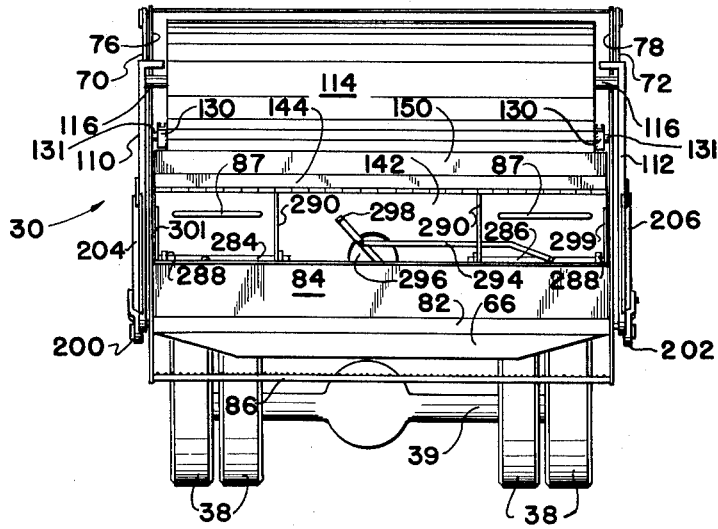
FIG. 2 is a rear elevation view of the vehicle illustrated in FIG. 1.
Figure 3:
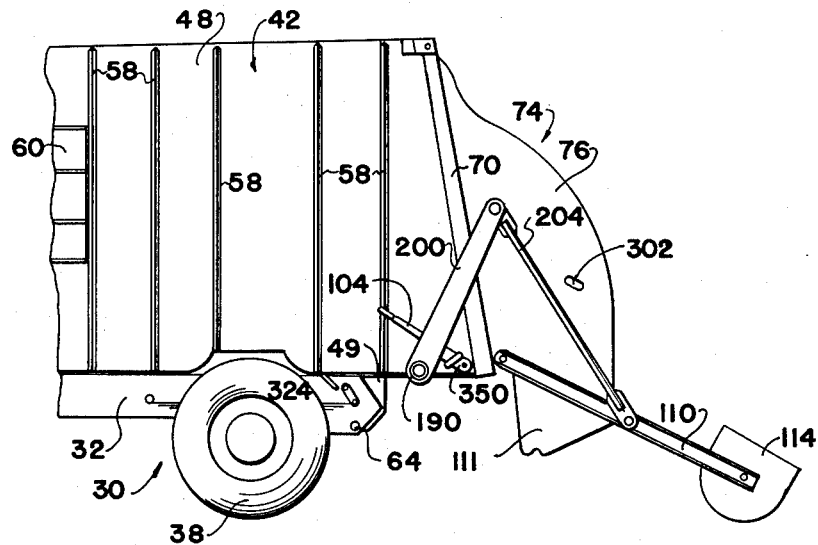

Two door frame members 70 and 72 are provided and are pivotally mounted in their upper end portions to opposite sides of the rear end portion of the bed 42 and are positioned at the sides of the rear end of the bed 42. An extension for the bed 42 is provided and is shown generally at 74 and includes spaced side portions 76 and 78 which are rigidly secured to the door frame members 70 and 72 and are movable therewith about the pivotal mounting of the door frame members. The side portions 76 and 78 can also be pivotally mounted at their upper edge portions to the rear end of the bed, if desired. The extension 74 of the bed also includes a bottom portion 80 having a depending flange 82 extending across the forward edge thereof, and an upwardly inclined rear portion 84. The extension 74 forms an extension of the bed 42 and extends rearwardly therefrom and a step or platform 86 can be secured to the side portions 76 and 78 to carry workers. Hand hold means 87 (FIGS. 2 and 15) are provided for the workers on platform 86.

Figure 9:
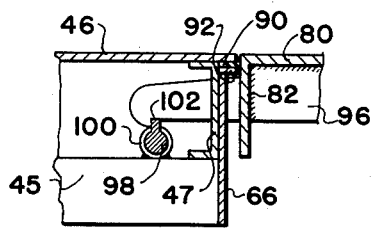
FIG. 9 is an enlarged partial cross section view taken along the line 9—9 of FIG. 7 showing the preferred embodiment of the mechanism for securing and maintaining the bed extension in position.
Figure 10:
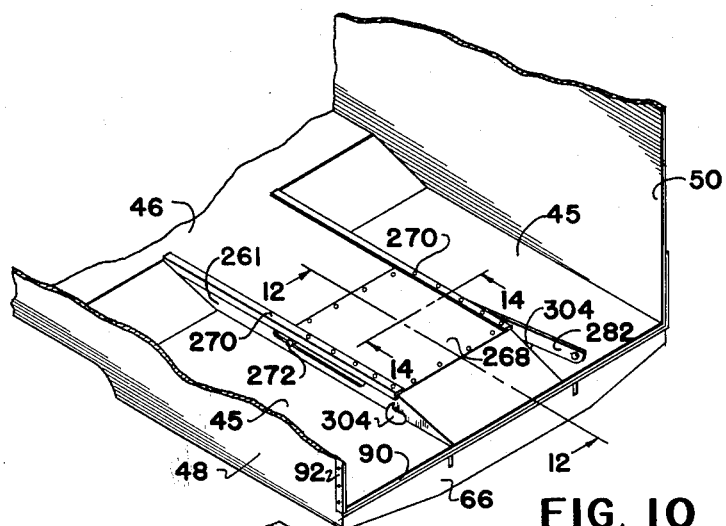
FIG. 10 is a cut-away isometric view of the rear portion of the vehicle bed with the bed extension and associated structure removed.
Figure 11:
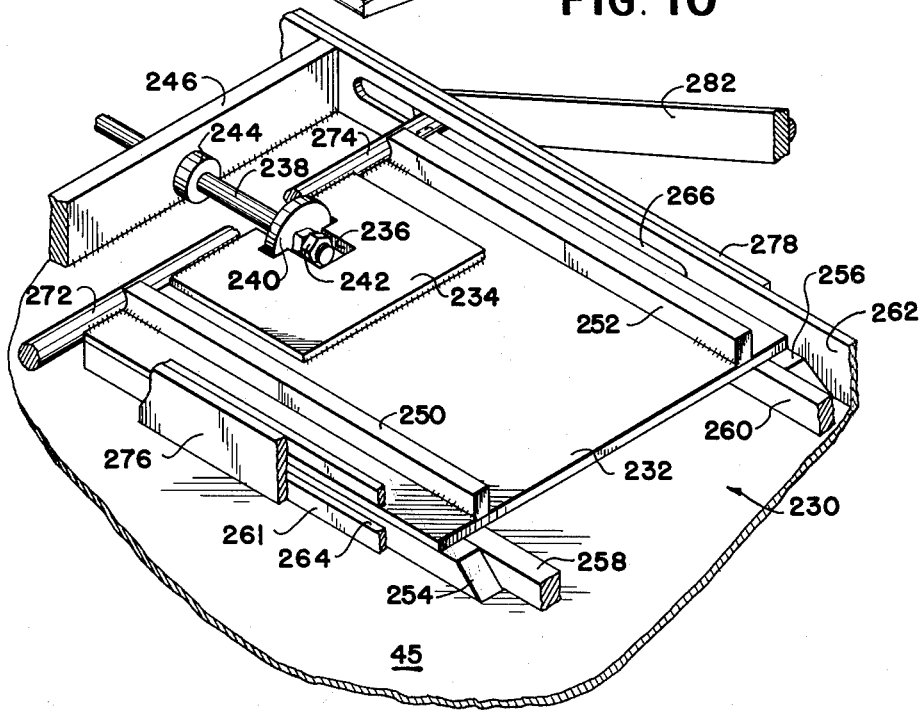
FIG. 11 is an enlarged cut-away isometric view showing the packer arm operating structure.

Suitable sealing means are desirably provided to seal the connection between the extension 74 and main portion of the bed 42 at least along the bottom and a portion of the way up the sides of the bed 42. This will prevent loss of liquids through the connection between the floor of the bed and the extension 74 and such is very desirable and almost essential in many areas due to requirements of sanitation officials. The preferred construction of the sealing means is best shown in FIGS. 9, 10 and 12 and includes an elongated piece of rubber of rubber-like materials, suitable plastic, etc. as shown at 90 and is secured in position by bolting or otherwise securing a flat plate or bar 92 to the bottom and sides of the bed 42 with the sealing member or strip 90 extending rearwardly from the rear end of the bed 42 to be engaged by the bottom 80 and sides 76 and 78 of the extension 74 when in position at the rear end of the bed 42. Thus, liquids within the bed of the truck and the extension cannot leave through the connection of same and the upwardly inclined portion 84 of the bottom 80 of the extension 74 will prevent the liquids from draining through the rear end of the extension.

Figure 7:
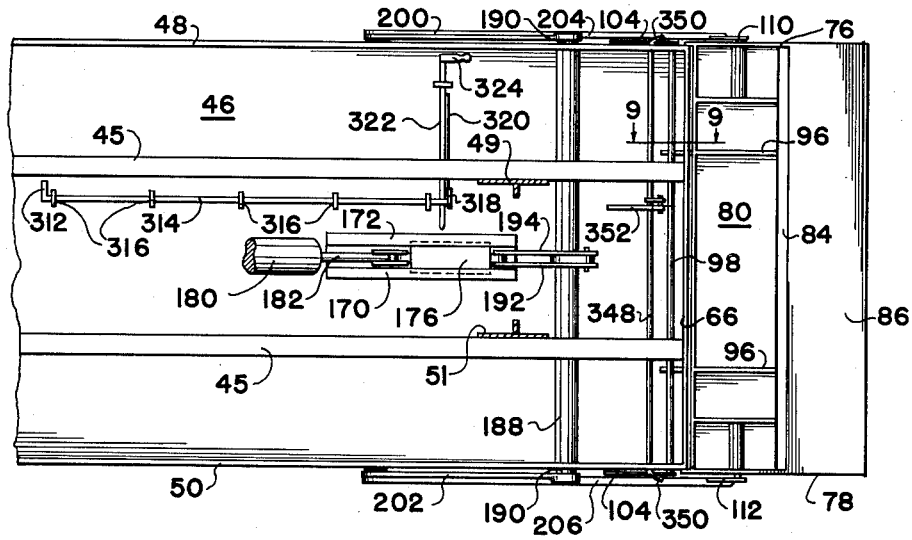
FIG. 7 is a bottom plan view of the truck bed of FIG. 1.

The extension 74 is held firmly in place against the rear end portion of the bed 42 by suitable means to maintain the desired seal. A preferred means of accomplishing this is best illustrated in FIGS. 7 and 9 and includes projecting hooks or the like 96 which are secured to the bottom 80 of the extension 74 and project forwardly therefrom through holes in the flange 66. A bar or rod 98 is rotatably mounted in bearings 100 and on the frame members 45 and a projection or cam 102 on the rod 98 is turned to engage the hook element 96 to maintain the extension in the desired position. Rod 98 is rotatable to the position shown in FIG. 12 to release the hook members 96 and permit movement of the extension 74. The handle 104 at each side of the bed 42 is secured to rod 98 to turn same.

Two booms 110 and 112 are provided and are pivotally mounted in their lower end portions to the sides 76 and 78 of the extension 74 of the bed. The booms have extensions or plates 111 secured thereto. A bucket 114 is provided and is pivotally mounted in its ends on the other end portion of booms 110 and 112. As best shown in FIGS. 21 and 22 the bucket 114 is pivotally mounted on the booms 110 and 112 by means of bearing or pivot means shown generally at 116 and preferably including two cylindrical members or bushings 118 and 120 which are rigidly secured to the booms and to the bucket, respectively, with the member 120 telescopically receiving the member 118 and with a bolt 122 or the like being rigidly secured to the booms and the bucket 114 to maintain the booms and bucket in the assembled relation. A tap or inlet 124 of common construction can be provided to furnish grease or other lubricating materials to the bearing surface between the members 118 and 120. Preferably, the bucket 114 is mounted slightly front of center so that the bucket will be in the up position when lowered. Suitable stops 126 are secured to the bucket 114 at the outer edges of the bucket and are engageable with a projecting portion 128 on the booms to limit pivotal movement of the bucket 114 and prevent inadvertent or accidental loss of the material contained therein. An elongated stop 130, FIG. 21, is provided and secured to the leading edge of one or both of the sides of the bucket 114 with the stop 130 engageable with a projection or roller 131 on one or both of the sides 76 and 78 of the extension 74 of the bed so that as the bucket is raised by the booms 110 and 112 the stop 130 will engage the projection or roller 131 and cause the bucket to be rotated about the pivot means 116 to invert and dump the bucket just as it reaches the uppermost position in the top rear portion of the bed extension 74.

Packer means are preferably provided to move refuse and the like deposited within the bed 42 by bucket 114 forwardly in the bed toward the front end 52 thereof and upwardly from the bottom 46 along the curved portion 56 and front 52 of the bed 42. As the packing operation continues refuse will be moved through the curved portion 54 joining the front 52 and top 44 of the bed and this preferred construction of the bed 42 will permit packing of the entire bed instead of just the lower and rear portions thereof.

The preferred packing means is best illustrated in FIGS. 2, 6, 15 and 16. The packing means is shown generally at 140 and includes a base portion 142 which is pivotally or hingedly mounted on the bottom 80 of the bed extension 74 and two spaced and generally horizontal extending plates 144 and 146 are pivotally or hingedly secured in one end portion to the base member 142 and extend into the packer or bed 42. The two horizontal plates 144 and 146 have a connecting plate 148 pivotally or hingedly secured thereto and preferably along the inner edge of the member 144 and an intermediate portion of the member 146. Two additional plates 150 and 152 are provided and the plate 150 is preferably rigidly secured to the inner end of the plate 144 and extends upwardly at an inclined angle therefrom and plate 152 is preferably rigidly secured to the inner end of the plate 146 and extends downwardly therefrom to be in close proximity to the bottom 46 of the bed 42. The plate 152 can be reinforced by a brace or plate 154, FIG. 15, and such will make the forward surface of plate 152 relatively rigid which is desirable in the packing operation.

Figure 6:
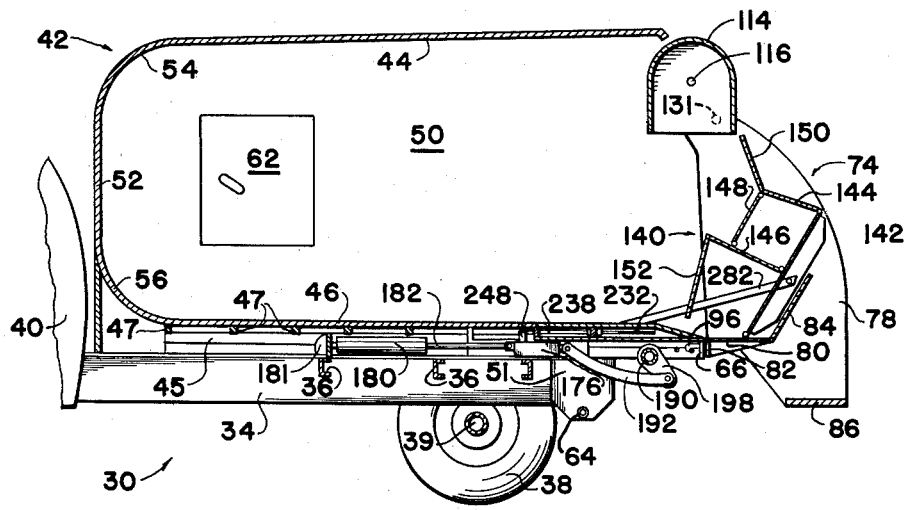
FIG. 6 is a longitudinal cross section view of the vehicle illustrated in FIG. 1.
Figure 15:
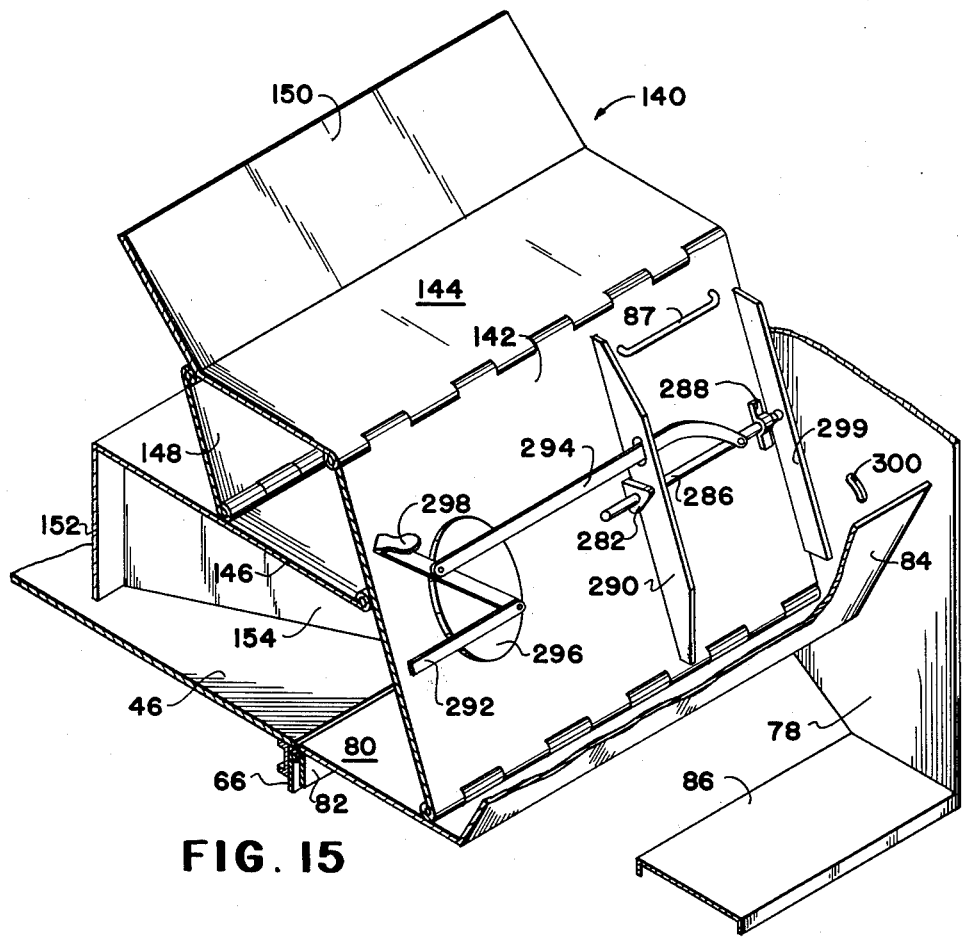
FIG. 15 is an enlarged partial isometric view of the packer means.
Figure 16:
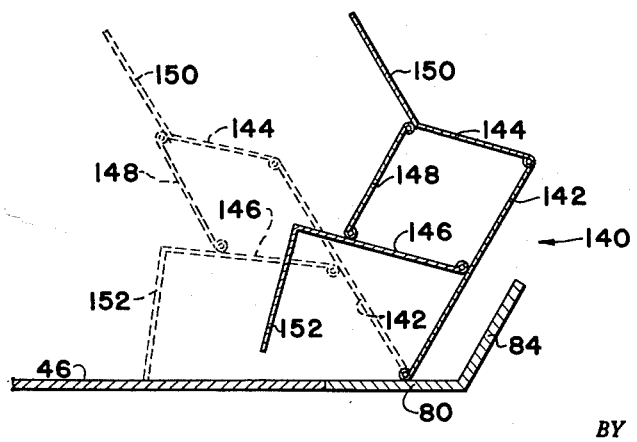
FIG. 16 is a cross section view on a reduced scale of the packer assembly or means, showing various positions of same.

The packer is constructed as described hereinbefore so as to be retractable into the extension 74 of the bed when the bucket 114 is in the up position as best illustrated in FIG. 6 and in the solid lines in FIG. 16. When the bucket is lowered to receive another load, the packer structure 140 moves forwardly into the bed 42 to the position illustrated in FIG. 15 and in the dashed lines in FIG. 16 with the plates 148, 150 and 152 forcing refuse and the like deposited in the bed 42 by the bucket 114 forwardly towards the front end 52 thereof. As will be apparent from a comparison of the solid and dashed lines in FIG. 16, the movement of the packer structure 140 is essentially a horizontal movement which has been found desirable to impart the greatest force to the packer structure.

The preferred construction of the operating means for moving the various parts and structures of the invention is best illustrated in FIGS. 6, 7 and 12–14. Such includes guide means secured to the bottom 46 of the truck bed 42, such means preferably including spaced side portions 160 and 162 and a top portion 164 which preferably has a slot in the top center portion thereof as shown at 166. The top 164 of the slide can be secured to the support of frame members 47 on the bottom of the truck bed 46 as shown or to other suitable structure. The bottom portion of the slide or guide is preferably at least partially closed by inwardly facing flanges or lips 168 and 170 which are secured to the sides 160 and 162 of the guide or otherwise supported.

A link or slide member 176 is mounted in the guide means for reciprocal movement therein. A servo-motor 180 is the preferred power means with the vehicle of the invention and is pivotally mounted on a bracket 181. The operating rod 182 of servo-motor 180 is pivotally connected to the link or slide member 176 in any suitable manner, such as by providing a recess 184 in one end portion of the slide member and a yoke shaped connecting member 183. Upon operation of the servo-motor 180, the operating rod 182 thereof will cause reciprocation of the slide member 176 within the guide means.

A fixed tube or pipe 188 is rigidly secured to the bottom 46 of the bed 42 and extends transversely thereacross rearwardly of the guide means and preferably extends to both sides of the bed. An axle 190 is rotatably positioned within the tube 188 and extends from both sides of the bed 42 and the tube 188. Connecting members 192 and 194 are pivotally secured in one end portion to the link member or slide 176 such as providing a recess 196 to receive the connecting members. The other end portion of the connecting members 192 and 194 are secured to one end portion of an operating arm 198 with the other end portion of the operating arm 198 being rigidly secured to the center portion of the axle 190 through an opening in pipe 188. With this means of connection operation of the servo-motor 180 will cause slide or link member 176 to be reciprocated and this reciprocatory movement will be transmitted through the connecting means 192 and 194 to the arm 198 to rotate the axle 190.

Two lever arms 200 and 202 are secured in one end portion to opposite ends of the axle 190 to turn therewith. Two link arms 204 and 206 are each pivotally secured in an end portion to the other end portions of the lever arms 200 and 202, respectively, and preferably to an intermediate portion of the booms 110 and 112, respectively, so that as the axle is rotated the lever arms and link members will move the booms to raise and lower the bucket.

The preferred means for connecting the booms and the link arms is illustrated in FIG. 17. Boom 110 is provided with a plate 210 which is apertured as shown at 211 and a mounting bolt or the like 212 passes therethrough. Link arm 204 is preferably provided with a flat end portion 214 which is also apertured as shown at 215. A cylindrical bearing or sleeve 216 is received by the mounting bolts 212 and positioned within the apertures or openings 211 and 215 within the plate 210 and the flat end portion 214 of the link arm 204. An enlarged washer or the like 218 can be provided and positioned adjacent the outside surface of the flat end portion 214 of the link arm 204 to limit outward movement of the bushing or bearing 216 and a nut 220 is received by the threaded end portion of the mounting bolts 212 to hold the entire assembly in the desired position. This mounting is relatively simple and is preferred both for its simplicity and its flexibility. The bearing as mounted normally wears only on the outside half of the bearing and along the bottom side thereof. As wear occurs, the nut 220 can be loosened and the bearing or bushing 216 rotated to provide a new wear surface. When the one end portion of the bushing 216 has become worn, the nut 220, washer 218 and link arm 204 can be removed and the bushing 216 reversed to provide a new bearing surface. This provides a relatively long surface life for the entire bushing and eliminates the need for frequent repair or replacement of moving parts often required on prior art devices.

The preferred means for operating the packer means 140 is best shown in FIGS. 10–14. The bottom 46 of the bed 42 is provided at its rear end portion with recessed portions 45 adjacent the sides 48 and 50. A closed chamber 230 is formed in the center or raised portion at the rear end and a plate 232 is positioned within the chamber and is slidably mounted therein and preferably extends substantially the entire distance thereacross. Plate 232 can be reinforced along its forward portion by another plate 234 to provide the desired strength or the plate 232 can be formed of relatively heavy metal to provide the desired strength. A recess 236 is provided in the forward portion of the plates 232 and 234 and a rod 238 extends thereinto and receives an enlarged washer or the like 240 which is positioned on the rod by nuts 242 with the washer extending into a longitudinal recess so that reciprocatory movement of the rod 238 will be imparted to the plates 232 and 234. A packing gland 244 is mounted on the front wall 246 of the chamber 230. Rod 238 extends through the packing gland 244 and is pivotally connected in its end portion by a yoke shaped member 239 to a flange 248 projecting upwardly from the slide or link member 176 through the slot or opening 166 in the guide means. Thus, the reciprocating movement of the slide 176 will be imparted to the plate 232 and the rod 238 is sealed by the packing gland 244 and prevents leakage of fluid therethrough.

Means are preferably provided to guide the movement of the plate 232 within the chamber 230. The preferred embodiment is illustrated in the drawings and best shown in FIGS. 11 and 14. Two bars 250 and 252 are rigidly secured to the upper face or surface of the plate 232 and extend longitudinally therealong a short distance inwardly from the sides of the plate. Two other bars 254 and 256 are rigidly secured to the bottom surface of the plate 232 and are positioned at the outer extremities of the plate 232. Bars 258 and 260 are secured to the bottom of chamber 230 and are positioned just inside the bars 254 and 256 so that side movement of the plate 232 is prevented. The bars 250, 252, 254 and 256 will prevent vertical movement of the plate 232.

The sides 261 and 262 of chamber 230 are provided with elongated slots 264 and 266, respectively, and are secured to the top and bottom of chamber 230. Angle irons 270 are preferably secured to the top 268 and extend down along the sides 261 and 262 and are preferably spaced a slight distance from the sides to form guides as best illustrated in FIG. 14.

Two rods 272 and 274 are rigidly secured to the forward end portion of the plate 232, the plate 234 and the bars 250 and 252 and extend to the sides of plate 232 and the rods 272 and 274 project through the slots or openings 264 and 266 in the sides 261 and 262. Two elongated plates or the like 276 and 278 are provided and the bars 272 and 274 pass therethrough. The plates 276 and 278 are positioned relative to the slots 264 and 266 so that they will be in tight engagement therewith and substantially close same and prevent passage of fluids and the like therethrough. Plates 276 and 278 are longer than the slots 264 and 266 so that as they move with the rods 272 and 274 the slots will remain closed. The bars or plates 276 and 278 are desirably held in position by the use of the angle irons 270 as best illustrated in FIG. 14. The chamber 230 is normally packed with a heavy lubricating material, such as gun grease or the like, to provide constant lubrication for the moving parts therein and such also has a sealing function that lighter liquids will not easily pass thereinto due to the presence of the heavy grease at any loose connections that might occur.

Two packers 280 and 282 are pivotally secured in one end portion to the bars 272 and 274, respectively. The packer arms 280 and 282 in operating position project upwardly and rearwardly from the rods 272 and 274 to pass through the base portion 142 of the packer means 140. The arms 280 and 282 are removably secured to the packer by any suitable means, such as by the use of bars or rods 284 and 286, FIGS. 2 and 15. Rods 284 and 286 are positioned on the base portion 142 of the packer 140 by the use of bearings 288 and by reinforcing flanges or projecting portions 290 extending rearwardly from the base portion 142 of the packer means 140. The rods 284 and 286 are slidably and movably mounted in the bearing means 288 and the projecting members 290 and arms 292 and 294 are secured in end portions to the bars 284 and 286, respectively. A generally circular plate or the like 296 is pivotally mounted on the center portion of the base plate 142 of the packer means 140 and the other end portions of the connecting arms 292 and 294 are eccentrically mounted on plate 296 so that as the plate is moved by operation of the handle 298 attached thereto the arm members 292 and 294 are moved in opposite directions to engage or disengage the packer operating arms 280 and 282. As is best observed from FIG. 15, when the packer arm 282 is engaged, the other end portion of the rod or bar 286 is positioned along the rear or outer surface of the base portion 142 of the packer means 140. Movement of the member 286 to disengage the packer operating arm 282 causes the bar 286 to move to the right hand side as shown in FIG. 15 and such will pass through an aperture or opening 300 in the side portion 78 of the extension 74. When the member 286 is disengaged from the packer arm 282, it is in engagement with the side portion 78 of the bed extension and thus locks same together. A similar result is obtained by movement of the rod 284 which passes through a hole 302 in the side 76 of the bed extension 74. The holes 300 and 302 are preferably slightly elongated as shown so that any inaccuracy in the positioning of the packer means 140 does not prevent movement of the rods 286.

In order to facilitate movement of the rods or bars 284 and 286 relative to the packer operating arms 280 and 282 projections or abutments 304, FIG. 10, are provided at the sides of chamber 230 and when the packer arms reach their rearmost position the lower edge of the arms will engage these abutments and cause the other end portion of the arms to be lifted slightly which facilitates the movement of the rods therethrough.

The packer arms 280 and 282 are connected to the base portion 142 of the packer means 140 during normal operation of the device. As will be apparent from the foregoing description the booms 110 and 112 are moved by the lever arms 200 and 202 through the link means 204 and 206 upon rotation of the axle 190 and the axle is rotated during reciprocation of the slide means 176 as a result of operation of the servo-motor 180. At the same time reciprocation of the slide means 176 also imparts a movement to the plate 232 and to the bars 272 and 274 attached thereto which causes movement of the packer operating arms 280 and 282 to move the packer means 140. This synchronized movement of the packer means and the lifting and lowering of the bucket insures the packer being at its rearmost or retracted position when the bucket reaches its uppermost position (FIG. 6). The packer moves forwardly to pack refuse and the like within the bed 42 when the bucket 114 is lowered to its lowermost position to pick up another load. When the entire bed 42 is loaded or it is desired to dump refuse within the bed, the handle 298 is moved to rotate the circular plate 296 mounted on the rear surface of the base plate 142 of the packer means 140 which in turn moves the rods 284 and 286 and same release the packer operating arms 280 and 282 and at the same time pass through the openings or slots 300 and 302 as well as through the plates or the like 299 and 301 at the edge of the packer to firmly fasten the packer means and the bed extension together. The handle 104 and one side of the bed 42 is then moved to rotate the shaft 98 and disengage the abutment or cam 102 from engagement with the hook member 96 on the bottom 80 of the bed extension 74. The bed extension and packer means are thus disengaged or released and forward movement of the slide member 176 will then rotate the axle 190 to move the lever arms 200 and 202 and the link members 204 and 206 which push rearwardly on the booms 110 and 112. The extensions or plates 111 on the booms have a notch therein which receives the rods 284 and 286 and the structure at the rear end of the bed will be urged upwardly about the pivotal mounting of the door frame members 70 and 72 at the top of the bed. This causes movement of this structure from the position shown in FIG. 1 to the position shown in FIG. 4, the arms 200 and 202 and links 204 and 206 moving past center to help maintain the structure in this position.

The forward portion of the bed 42 is secured to the forward portion of frame means 32 and 34 so as to prevent inadvertent lifting of the bed during loading operations. This is accomplished by a U-shaped bar or the like 310, FIGS. 8 and 18, which can be mounted on one of the cross frame members 36 secured in their end portions to the frame means 32 and 34. A hook member 312, FIGS. 7 and 18, is engageable with the U-shaped bar 310 when the bed and frame means are in close proximity. The hook means 312 is carried by one end of a rod or bar 314 which is supported by a plurality of supports 316 on the bottom of the bed. As best illustrated in FIG. 7, the other end portion of the bar 314 has an arm 318 connected to a link member 320 which in turn is connected to a bar or rod 322 operated by a handle 324. Movement of the handle 324 into and away from the arm 318 causes rotary movement of the rod 314 and a similar movement with the hook-shaped member 312 attached thereto and this engages and disengages the forward portion of the bed or body and the frame means of the vehicle.

Figure 4:
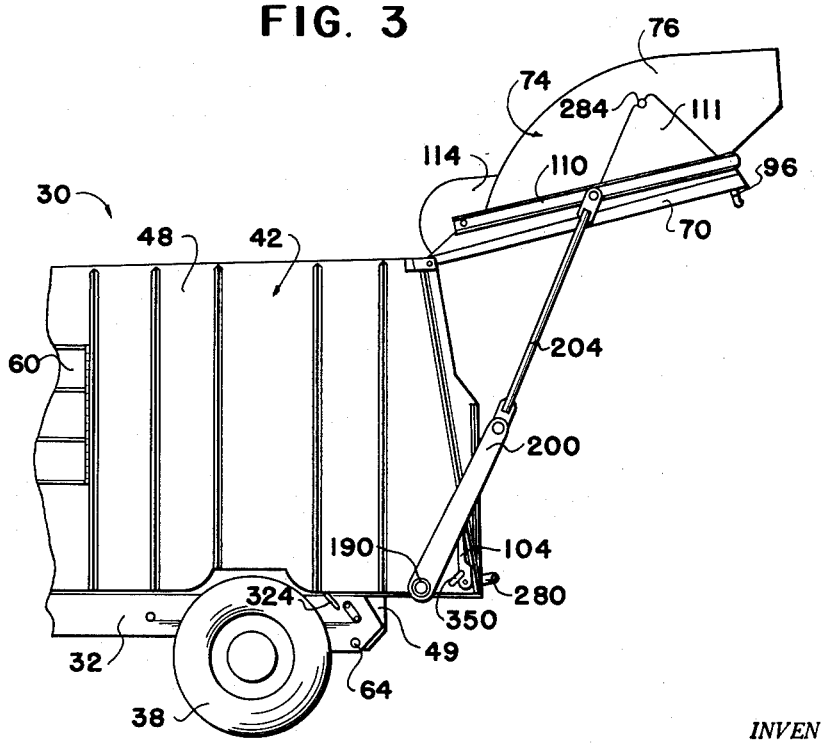
FIG. 4 is a partial side elevation view showing the structure at the rear of the bed elevated and with the bed ready to be elevated.
Figure 5:
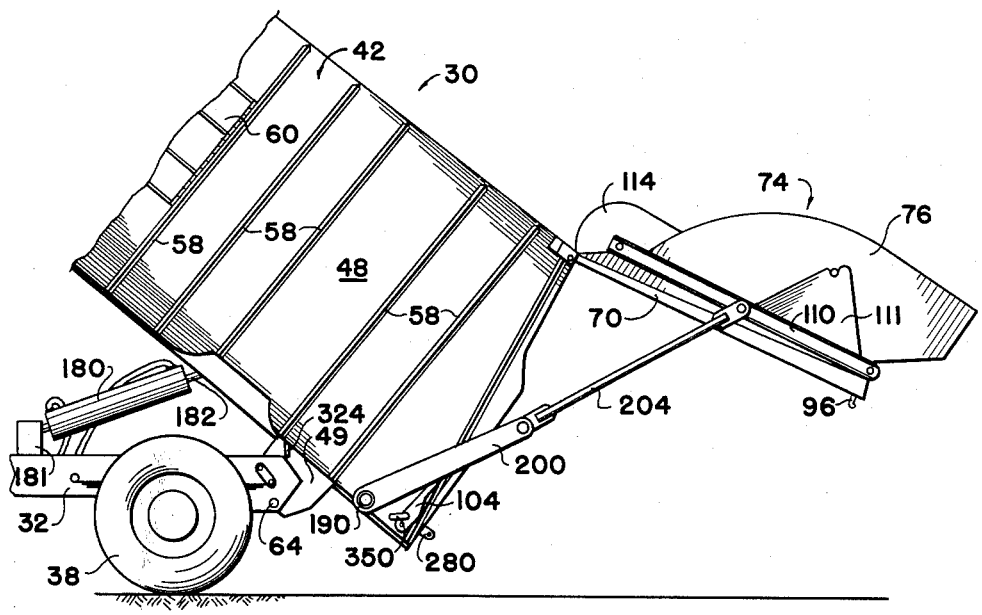
FIG. 5 is a partial side elevation view of the bed in dumping position.

As is best seen in FIG. 7, the other end portion of the rod or operating member 322 is normally adjacent to the guide means and when the handle is moved toward the guide means to disengage the hook member 312 from the U-shaped member 310, then the end portion of the member 322 will pass through an opening 326 (FIG. 12) in the side of the guide means to position the rod 322 forward of the slide or link member 176 so that further operation of the servo-motor tending to move the slide 176 rearward will instead be imparted directly to the bed 42, causing same to tilt about the pivot 64 and move the entire bed from the position shown in FIG. 4 to the position shown in FIG. 5. The refuse and the like within the bed 42 will be removed therefrom by the force of gravity and without the necessity of complicated unloading structure sometimes required with prior art devices. When the operating mechanism reverses the movement of the operating rod 182 of the servo-motor 180, the entire bed will again tilt about the pivot 64 to move same to its normal position resting on the frame means and movement of the handle 324 moves bar 322 outwardly from the guide means and such will engage hook 312 with the U-shaped bar 310 to lock the forward portion of the bed in the desired position on the frame means. With the slide or link member 176 thus disengaged and ready for movement, rearward movement of the link member 176 by operation of the servo-motor 180 will cause the axle 190 to be rotated and the lever arms 200 and 202 to be moved to lower the extending portion 74 of the truck bed and the associated structure from the position shown in FIG. 4 to the position shown in FIG. 1. The handle 104 is then turned to rotate the shaft 98 and move the cam member 102 into engagement with the hook-shaped element 96 and urge the entire extending portion of the bed into tight and sealing engagement with the main portion of the bed 42, the sealing strip 90 being compressed by this operation.

As the bed extension 74 is moved from the position shown in FIG. 4 to the position shown in FIG. 1 the packer arms are moved rearwardly and the projecting ends are elevated to pass through the packer by the arms engaging abutments 304. The handle 298 on the base portion 142 of the packer means 140 is then moved to cause the rods or bars 284 and 286 to be moved toward each other to unlock the bed extension 74 and the packer means 140 and in the same operation to engage or connect the packer operating arms 280 and 282 with the base portion 142 of the packer means. This operation also releases the booms 110 for further movement and the vehicle is now ready for further loading in the manner described hereinbefore.

Figure 8:
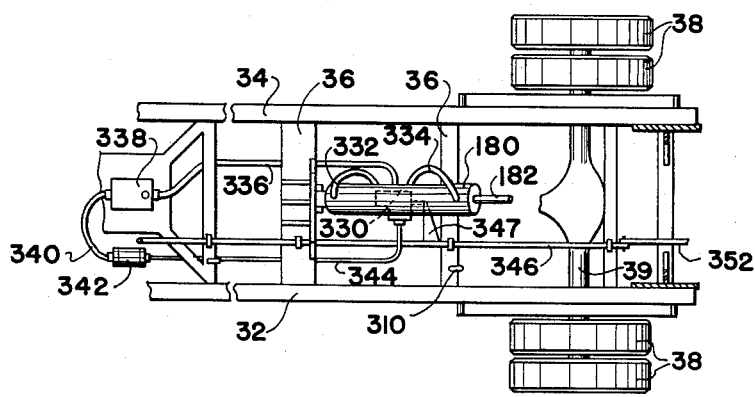
FIG. 8 is a top plan view of the rear portion of the supporting chassis and showing the hydraulic system used in the preferred embodiment of the invention.

The preferred hydraulic system and operating means is best shown in FIGS. 8 and 20 of the drawings. This system includes a valve member 330 which has one end of hoses 332 and 334 secured thereto. The other end of hoses 332 and 334 are connected to the end portions of the servo-motor 180 to direct hydraulic fluid to one end or the other of the piston within the motor and thus cause extension or retraction of the operating rod 182. Another hose 336 connects the valve member 330 to a fluid reservoir 338 and hose 340 connects the reservoir to a hydraulic pump 342 of common construction. The pump 342 is preferably operated by power take-off means (not shown) from the engine of pulling vehicle. Pump 342 is connected to the valve member 330 by a conduit 344 and the valve member can be operated to provide fluid under pressure from the pump 342 and reservoir 338 to one end or the other of the servo-motor 180 and during idle periods for the motor 180 the hydraulic fluid is pumped through the valve means 330 and through line 336 back to reservoir 338. A link member 346 is connected through an arm 347 to the operator for valve 330 and the end portions of the link member 346 are connected to operating means. One of the operating means includes an elongated handle or the like 348 which preferably extends to both sides of the bed and has hand grip means 350 therewith so that operation of the rod 348 will cause reciprocation of member 346 acting through the connecting linkages 352 and 354. Thus, the hand grip means 350 can be utilized from either side of the rear end portion of the vehicle to cause the desired movement or operation of the servo-motor. The other end of the member 346 is preferably connected to an operating arm or handle 356 which is desirably positioned within the cab 40 of the vehicle and is pivotally mounted by the pivot 358 so that the mechanism can be operated from the cab as well as from the rear end portion of the truck.

As will be seen from the foregoing description of the vehicle of the invention, a highly efficient and relatively simple device has been provided which eliminates a number of the necessary lever arms, linking members and the like necessary with prior art devices and also provides a strong and highly efficient packing means which directs the force of its movement almost straight forward into the bed to firmly and tightly pack refuse and the like within the bed, thus resulting in a relatively large capacity for the bed 42. This eliminates frequent trips to the dump and reduces the time necessary to handle a given amount of material. Also, the entire device is sealed, including the connection of the bed extension to the bed and the reciprocating packer arm operating structure. This permits utilization of applicant's device in localities where non-sealed beds are prohibited. Also, a single servo-motor is utilized for all of the operations, both loading and unloading, and this reduces construction and maintenance costs.

As will be apparent from the foregoing discussion and description, various modifications or changes can be made in the light of this description and discussion without departing from the spirit of the disclosure or the scope of the claims.

I claim:

1. A vehicle having loading and unloading apparatus comprising, in combination, an elongated frame, wheel means supporting said frame for movement, a bed tiltably mounted in its rear end portion on the rear end portion of said frame, said bed being open at the rear end thereof, two door frame members, said door frame members being pivotally mounted at the upper end portions thereof to opposite sides of said rear end of said bed, a movable extension of said bed, said extension having spaced side portions rigidly secured to said door frame members and pivotally mounted at their upper end portion at the top of said rear end of said bed with a bottom portion engaging the rear end of said bed and forming an extension thereof with said bottom portion having an upwardly inclined rear portion, sealing means mounted on said rear end of said bed and extending across the bottom and along the sides thereof and sealingly engaged by said extension of said bed, two booms, said booms being pivotally mounted in one end portion to opposite sides of the lower portion of said extension of said bed, a bucket, said bucket being pivotally mounted on the other end portion of said booms, a packer, said packer having a base portion pivotally mounted on said bottom portion of said extension of said bed and two spaced generally horizontally extending plates pivotally secured in one end portion to said base and extending into said bed, said packer having a connecting plate pivotally secured along its edges to the other end portion of said horizontal plates and two fixed plates, one of said fixed plates being secured in one end portion to the lower one of said horizontally extending plates and having the other end portion positionable adjacent the bottom of said bed, the other of said fixed plates being secured to the upper one of said horizontally extending plates and projecting upwardly therefrom, said packer being retractable into said extension of said bed when said bucket is in the uppermost position and extendable therefrom into said bed when said bucket is in the lowermost position to move refuse and the like deposited in said bed by said bucket further into said bed, guide means secured to the bottom surface of said bed, said guide means having a slot in the top thereof, a slide reciprocally mounted in said guide, a servo-motor secured to said frame means, the operating rod of said servo-motor being operatively connected to said slide to move same upon operation of said motor, a fixed tube rigidly secured to said bed and extending transversely thereacross, an axle rotatably positioned in said tube and extending therefrom to both sides of said bed, an operating arm rigidly secured to said axle and extending through an intermediate portion of said tube, connecting means secured in the end portions to said slide and said operating arm so that when said slide is reciprocated by said servo-motor said axle will be rotated, two lever arms, one of said lever arms being rigidly secured to each end of said axle to turn therewith, two link arms, each of said link arms being secured in its end portions to the other end portion of said lever arm and to an intermediate portion of said booms to move said booms and raise and lower said bucket when said axle is rotated, a projecting flange on said slide extending upwardly through said slot in said guide means, a closed chamber in said bottom of said bed, a plate slidably mounted in said chamber, means operatively connecting said flange with said last-named plate to move said plate upon movement of said slide, two rods secured to said last-named plate and projecting through opposite sides of said chamber, two packer operating arms, said operating arms being pivotally secured in one end portion to said rods and removably secured in the other end portion to said packer, lock means mounted on said base portion of said packer and operable to engage and disengage said operating arms on said packer and to secure said extension of said bed and said packer together, hook means carried by said extending portion of said bed and removably engageable with the bottom of said bed, other hook means movably mounted on the bottom of said bed and engageable with projecting means on said frame, an operating rod for said last-named hook means, said operating rod passing through said guide when said last-named hook means is released to prevent rearward movement of said slide to tilt said bed upon operation of said motor, said vehicle being constructed and adapted so that refuse and the like deposited in said bucket can be lifted and deposited in said bed with said packer moving same in said bed and with said packer, said extension of said bed and said booms being movable upwardly about the upper portion of said bed so that when said bed is tilted refuse and the like therein will be removed therefrom.

2. A vehicle having loading and unloading apparatus comprising, in combination, an elongated frame, wheel means supporting said frame for movement, a bed tiltably mounted in its rear end portion on the rear end portion of said frame, said bed being open at the rear end thereof, a movable extension of said bed pivotally mounted at the upper end portion to the top portion of the rear end of said bed with the sides and bottom portion of said extension engaging the rear end of said bed and forming an extension thereof, said extension being sealingly engageable with the rear end of said bed, two booms, each of said booms being pivotally mounted in one end portion to said extension of said bed, a bucket pivotally mounted on the other end portion of said booms, packer means movably mounted on said bottom portion of said extension and constructed and operable to move forwardly into said bed when said bucket is lowered and to be retracted therefrom when said bucket is raised to the dumping position, said packer means substantially closing the lower rear end portion of said bed, guide means secured to the bottom surface of said bed, an opening in the top of said guide means, a slide movably mounted in said guide, a servo-motor mounted on said frame means, the operating rod of said servo-motor being operatively connected to said slide to move same upon operation of said motor, an axle rotatably mounted on the bottom of said bed and rearwardly of said slide with said axle extending to both sides of said bed, linking means with said axle and said slide so that when said slide is reciprocated by said servo-motor said axle will be rotated, two lever arms, one of said lever arms being secured in one end portion to each end of said axle to turn therewith, link means secured to the other end portion of said lever arms and to said booms to move same and raise and lower said bucket when said axle is rotated, a sealed chamber in said bottom of said bed, a plate slidably mounted in said chamber, means operatively and sealingly connecting said plate with said slide through said opening in said guide means, two packer arms within said bed, one end portion of each of said packer arms being operatively and sealingly connected to said plate to move with same and the other end portion of each of said packer arms being operatively connected to said packer means to move same upon movement of said plate and said slide, means with said packer means to disengage said packer arms from said packer means and to connect said packer means, said extension of said bed and said booms together to be elevated about said pivotal mounting of said extension upon operation of said servo-motor and movement of said axle, and means to disengage said extension and the forward portion of said bed from said frame means and to prevent rearward movement of said slide so that upon operation of said motor said bed will be tilted to discharge the contents thereof.

References Cited in the file of this patent
UNITED STATES PATENTS

| | | |
|---|---|---|
| 2,101,067 | Howard | Dec. 7, 1937 |
| 2,511,556 | Wood | June 13, 1950 |
| 2,541,965 | Hensley | Feb. 13, 1951 |
| 2,750,056 | Dow | June 12, 1956 |

FOREIGN PATENTS

| | | |
|---|---|---|
| 649,350 | Germany | Aug. 26, 1937 |